United States Patent [19]

Pollak

[11] Patent Number: 5,547,319

[45] Date of Patent: Aug. 20, 1996

[54] MACHINE TOOL APPARATUS HAVING A WORK PIECE SUPPORT TABLE SUPPORTED BY AN ARTICULATING ARM

[75] Inventor: Henry Pollak, Pottstown, Pa.

[73] Assignee: American Machine & Tool Company, Inc., Royersford, Pa.

[21] Appl. No.: 429,209

[22] Filed: Apr. 24, 1995

[51] Int. Cl.⁶ .............................. B23B 47/00; B23Q 1/04
[52] U.S. Cl. ................... 408/90; 408/87; 408/91; 408/234; 403/366
[58] Field of Search .................... 408/87, 88, 90, 408/91, 234, 236, 237; 403/366; 248/413; 269/309; 409/224

[56] References Cited

U.S. PATENT DOCUMENTS

| | | | |
|---|---|---|---|
| 1,449,456 | 7/1924 | Hartman | 408/90 |
| 2,194,800 | 3/1940 | Ley | 403/366 |
| 4,118,141 | 10/1978 | Spohn, Jr. | 408/90 |
| 5,413,440 | 5/1995 | Wilson et al. | 408/111 |

OTHER PUBLICATIONS

American Machine & Tool Company brochure, "Power Tools Plus" Winter '94, front cover, p. 20, rear cover.

Primary Examiner—Steven C. Bishop
Attorney, Agent, or Firm—Panitch Schwarze Jacobs & Nadel, P.C.

[57] ABSTRACT

A machine tool apparatus having a work piece support table supported by an articulating arm. The machine tool apparatus includes a stand and a motor mounted to the stand. A movable cutting tool holder is provided and a transmission mechanism is drivingly coupled between the motor and the cutting tool holder on the stand. The apparatus also includes a work piece support table and a table positioning support movably coupled to the stand. Part of the table positioning support projects outwardly from the stand. The apparatus further includes an arm having first and second ends. The first end of the arm is pivotably coupled with the projecting part of the table positioning support. The second end of the arm is rotatably coupled with the work piece support table.

20 Claims, 7 Drawing Sheets

MACHINE TOOL APPARATUS HAVING A WORK PIECE SUPPORT TABLE SUPPORTED BY AN ARTICULATING ARM

FIELD OF THE INVENTION

The present invention relates to work piece support tables for machine tools. More particularly, the present invention is directed to a drill press having an articulating arm for supporting a work piece support table.

BACKGROUND OF THE INVENTION

Machine tools are used for a variety of cutting, drilling, machining, sanding and polishing operations. Of the various machine tools, the drill press is regularly used for more different functions than any other machine tool in the workshop. It is used to drill and ream, and can also be used for sanding, shaping, grinding, tapping threads, turning and almost any other woodworking job except sawing.

For many of the above-described operations, it is necessary to clamp a work piece to a work piece support table to hold the work piece, typically a piece of wood, in a steady position as the operation is being carried out on the work piece. If a series of holes are being drilled in a single work piece, the user must generally unclamp the work piece and shift the work piece position prior to drilling the next hole. The unclamping and movement of the work piece is often time consuming, requiring extra care in order to accurately re-position the work piece and clamp it in position on the work piece support table.

In order to alleviate the problem of having to unclamp and re-position the work piece, some drill presses are provided with a head assembly (which typically includes a motor, a moveable spindle and quill, and a power transmission mechanism) having a horizontal column which is slidably mounted to the drill press stand. This type of mounting arrangement for the head assembly allows the head assembly to be moved relative to the work piece, eliminating the need to unclamp the work piece from the support table in some cases. Although this system provides greater versatility than drill presses with a fixed head assembly, it is still often necessary to unclamp and reposition the work piece in order to carry out additional drilling or other operations.

Other types of machine tools, such as milling or boring machines generally include an X-Y table which is mounted for linear movement in the X and Y directions. This allows for re-positioning a work piece without unclamping it from a support table. However, X-Y tables require precision machined and ground lead screws and machined ways for movement of the table. These types of X-Y tables are often very expensive and, as a practical matter, are not generally used on drill presses.

The present invention resulted from observation of the limitations with the prior art drill presses and efforts to solve them.

SUMMARY OF THE INVENTION

The present invention is directed to a machine tool apparatus having a work piece support table supported by an articulating arm.

In one aspect, the present invention comprises a machine tool apparatus having a work piece support table supported by an articulating arm. The apparatus includes a stand and a motor mounted to the stand. A movable cutting tool holder is provided and a transmission mechanism is drivingly coupled between the motor and the cutting tool holder on the stand. The apparatus also includes a work piece support table and a table positioning support movably coupled to the stand. Part of the table positioning support projects outwardly from the stand. The apparatus further includes an arm having first and second ends. The first end of the arm is pivotably coupled with the projecting part of the table positioning support. The second end of the arm is rotatably coupled with the work piece support table.

In another aspect, the invention is an articulating arm which can be supplied separately as an improvement to such a machine tool apparatus.

The articulating arm allows the work piece support table, with an attached work piece, to be repositioned without unclamping the work piece from the support table.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF PREFERRED EMBODIMENTS

Figure 1:
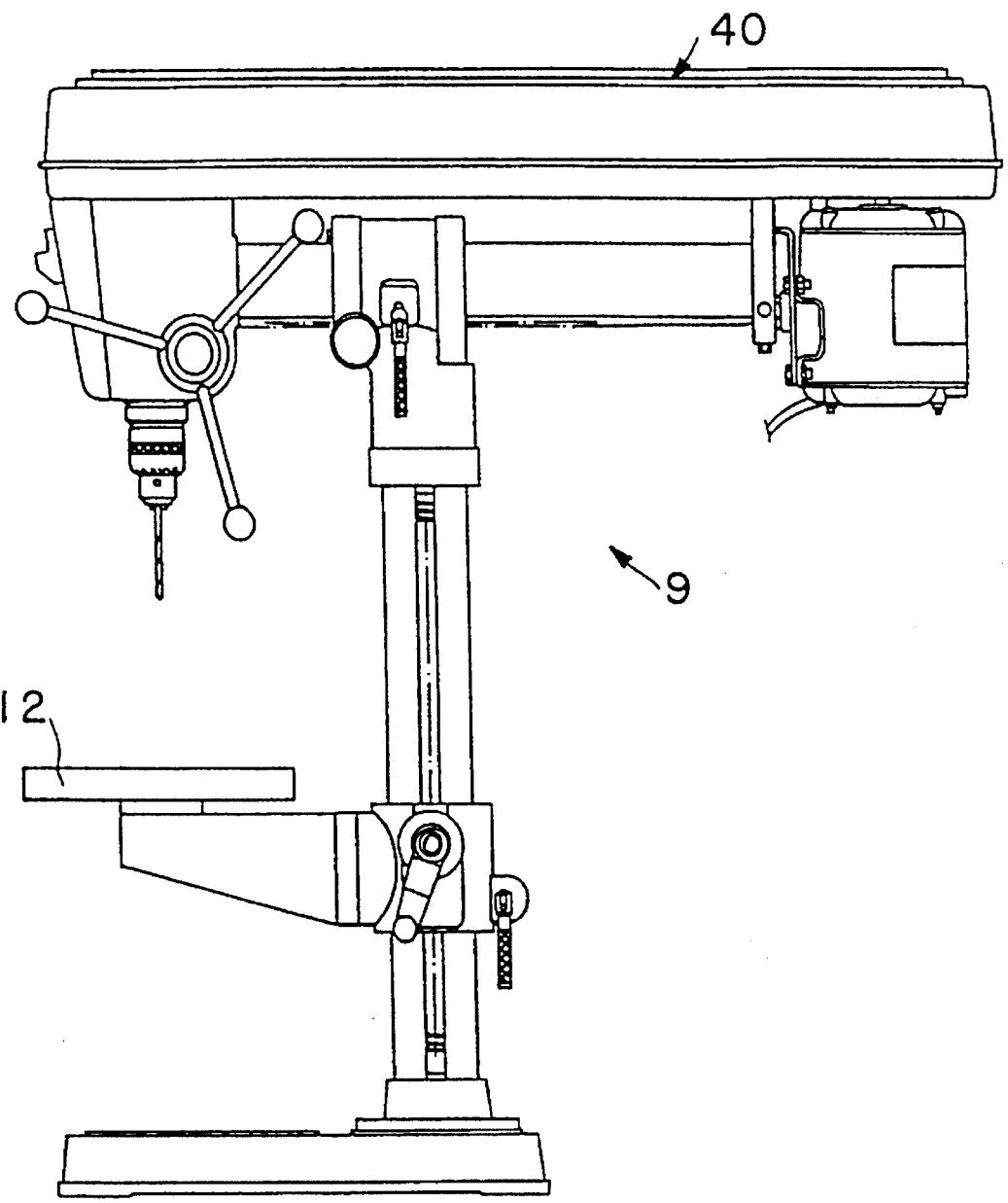
FIG. 1 is an elevational view of a radial drill press in accordance with the prior art.

Certain terminology is used in the following description for convenience only and is not limiting. The words "right," "left," "lower", "upper", "horizontal" and "vertical" designate directions in the drawings to which reference is made. The words "inwardly" and "outwardly" refer to directions toward and away from, respectively, the geometric center of the machine tool apparatus having a work piece support table supported by an articulating arm and designated parts thereof. The terminology includes the words above specifically mentioned, derivatives thereof and words of similar import.

Referring to the drawings, wherein like numerals indicate like elements throughout, there is shown in Figs. 2–6 a preferred embodiment of a machine tool apparatus 10 in accordance with the present invention. In the preferred embodiment, the machine tool apparatus 10 is a radial drill press having a work piece support table 12 supported by an articulating arm 14. The machine tool apparatus 10 is similar to the prior art apparatus 9, shown in FIG. 1, but further includes the articulating arm 14 for positioning of the work piece support table 12. Although the machine tool apparatus 10 is similar in construction to the prior art apparatus 9 (shown in FIG. 1), a brief description of the major components follows in order to provide a complete description of the invention.

Figure 2:
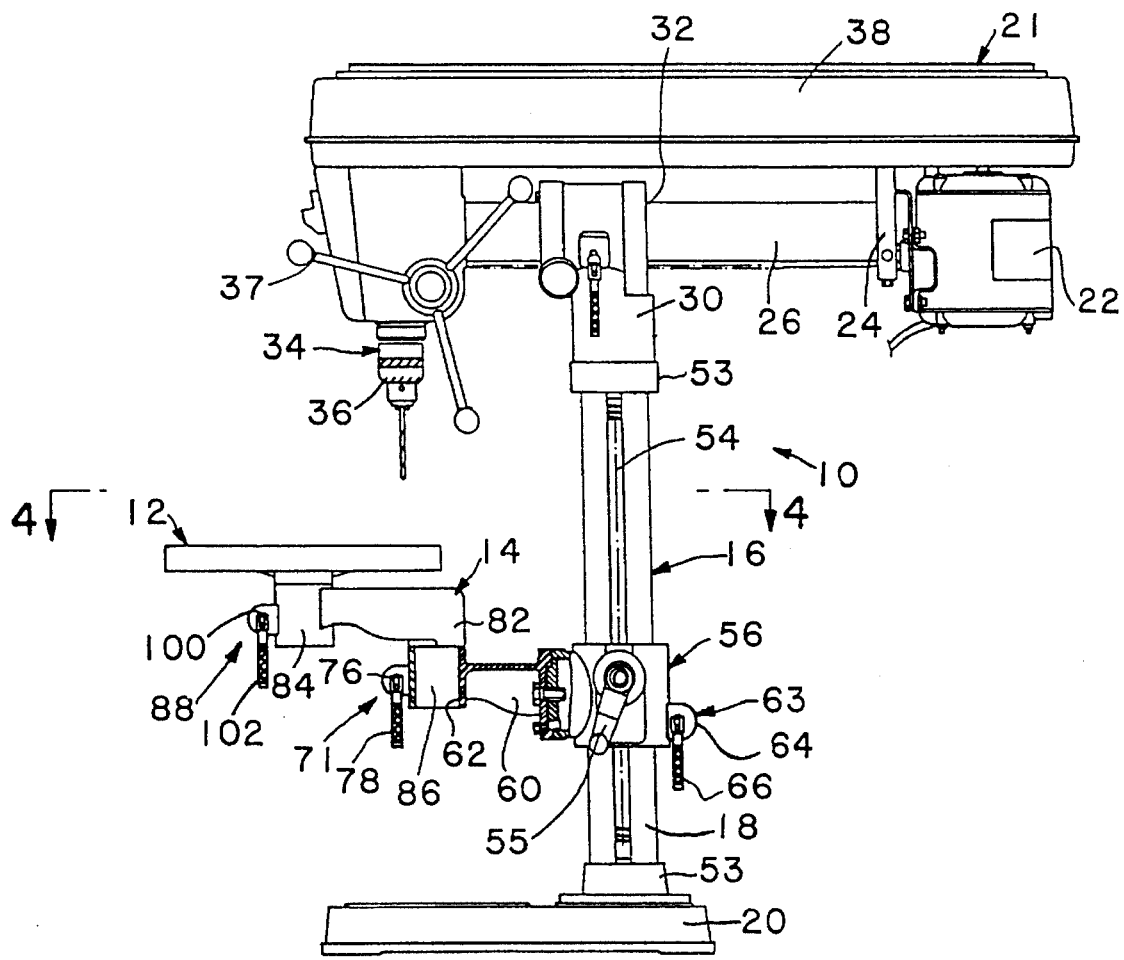
FIG. 2 is an elevational view of a machine tool apparatus in accordance with the present invention.

Referring now to FIG. 2, the machine tool apparatus 10 includes a stand 16. The stand 16 is comprised of a vertical column 18 mounted to a base 20. The column is preferably a 2 7/8" diameter precision ground steel tube to insure smooth operation and accuracy. The base 20 is preferably rectangular in form having a large enough footprint to provide adequate support and stability for the machine tool apparatus 10. Preferably, the base 20 is made of cast iron. However, it is understood by those skilled in the art that the vertical column 18 can be made from other materials having sufficient strength and the column diameter can be varied to suit particular applications. Additionally, the shape of base 20 may be varied, if desired, without departing from the spirit and scope of the present invention.

A head assembly 21 is mounted to the stand 16. The head assembly 21 includes a motor 22, which is attached to the stand 16 through a base plate 24 affixed to the end of a horizontal column 26. The horizontal column 26 is slidably supported by a yoke 30 which is attache to the top of the vertical column 18. The horizontal column 26 is slidably disposed in an opening 32 in the yoke 30 such that the head assembly 21 is moveable in a linear direction and rotatable in the yoke 30.

The head assembly 21 also includes a movable cutting tool holder, generally designated 34, located on the opposite end, of the horizontal column 26 from the motor 22. The cutting tool holder 34 includes a drill chuck 36 drivenly coupled with a spindle (not shown) which is rotatably mounted in a movable quill (not shown). Hand levers 37 are used to move the quill and the spindle up and down to carry out drilling operations. A transmission mechanism 38 is drivingly coupled between the motor 22 and the cutting tool holder 34 on the stand 16.

This arrangement of the head assembly 21 is generally known to those skilled in the art, as shown by the prior art device, which is commercially available from a variety of sources. Additional details for the head assembly 21 for the machine tool apparatus 10 are not necessary for a complete understanding of the present invention, and therefore, will not be further presented herein. Such details are available from various drill press manufacturers. One such commercially available device is American Machine & Tool Company Model No. 4910. However, it will be appreciated by those skilled in the art that the head assembly 21 could take other forms such as a fixed mounted head assembly. Additionally, the shape and size of the head assembly and its components can be varied to suit particular applications without departing from the spirit and scope of the present invention.

Figure 3:
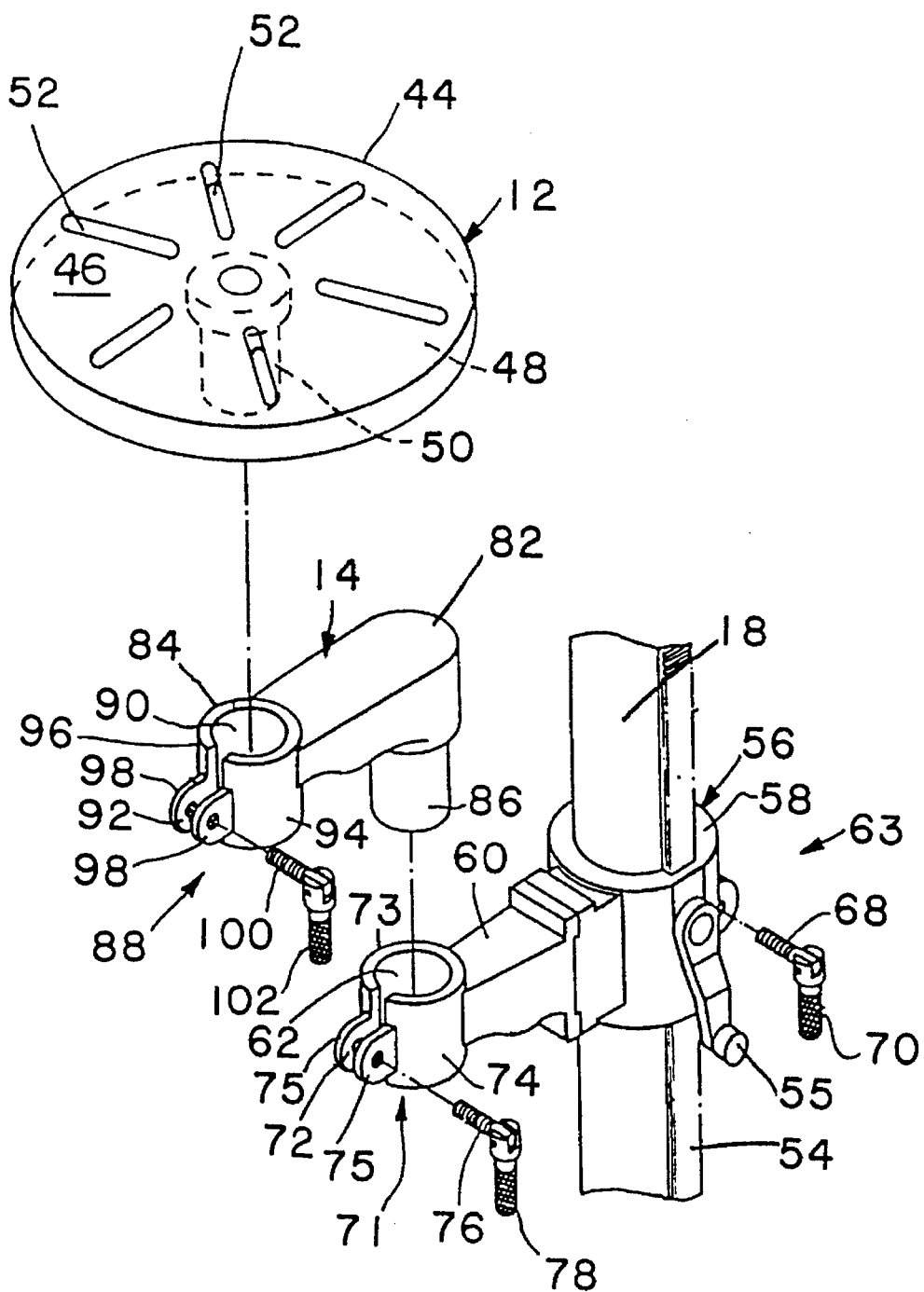
FIG. 3 is a partially disassembled perspective view of a portion of the machine tool apparatus of FIG. 2 showing an articulating arm.

Referring to FIG. 3, the work piece support table 12 is shown in detail. The work piece support table 12 includes an upper platform 44 having a flat upper surface 46 and a lower surface 48. A cylindrical pivot post 50, having an axis which is normal to the upper surface 46, depends from a centered position on the lower surface 48 of the support table 12. A plurality of clamping slots 52 are defined in the platform 44 in an equally spaced radial pattern. In the preferred embodiment, the support table 12 has a circular platform 44, and six radially-spaced slots 52 are provided through the platform 44. Preferably, the support table 12 is cast iron with a machined upper surface and a precision ground pivot post 50. However, it is understood by those skilled in the art from the present disclosure that the support table 12 can take various forms, such as rectangular or square, and the slots 52 may be positioned in various configurations. Additionally, the pivot post 50 need not be centered with respect to the platform 44. If desired, the pivot post can be located closer to one edge of the platform 44. Finally, the support table 12 may be made of other materials, such as machined steel or any other material having suitable strength.

Referring now to FIGS. 2-6, a table positioning support 56 is movably coupled to the stand 16. The table positioning support 56 has first and second ends. The first end of the table positioning support 56 includes a collar 58, having a bore 59, which is movably mounted on a column 18 for pivotal movement in a first plane and linear movement in a direction normal to the first plane. The collar 58 is rotatably disposed on the column 18 of the stand 16 to provide a pivotal coupling of the support 56 to the stand 16. The table positioning support 56 is also slidably movable on the vertical column 18, and linear movement is provided by a lever 55 on the table positioning support 56 which drives a gear (not shown) that engages gear rack 54 on the vertical column 18. Gear rack 54 is supported by and between collars 53, which are also rotatably positioned around the column 18.

Part of the table positioning support 56 extends outwardly from the stand 16 and includes a support arm 60. A bore 62 is defined in the support arm 60 at the second end of the table positioning support 56. The bore 62 defines an axis parallel to at least one direction of motion of the table positioning support 56 on the column 18. Preferably, the axis is parallel to the column 18.

Figure 4:
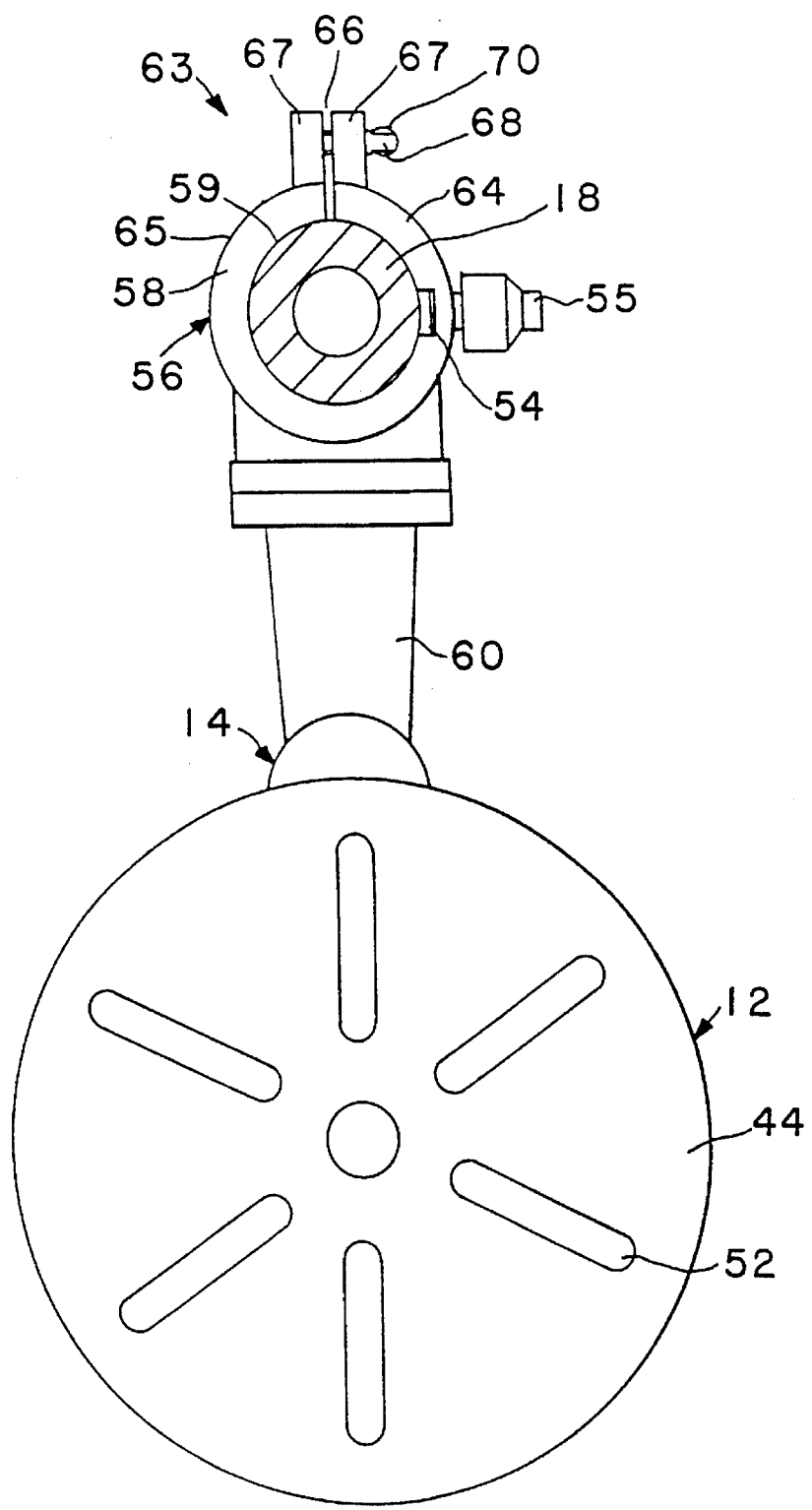
FIG. 4 is a section view of the machine tool apparatus of FIG. 2, taken along line 4—4 in FIG. 2, showing a support table mounted in a first position on the articulating arm.

Referring now to FIG. 4, a table positioning support lock mechanism 63 is shown in detail. The table positioning support lock mechanism 63 is located on the first end of the table positioning support 56 and releasably fixes the first end of the table positioning support 56 to the column 18. The lock mechanism 63 includes a slot 66, which extends parallel to the column 18 and intersects the bore 59 to split the collar 58 into two clamping members 64 and 65. Flanges 67 extend outward from the clamping members 64 and 65 on either side of the slot 66. A threaded locking screw 68 with a pivoting lever 70 is inserted through aligned apertures in the clamping member 64.

Referring again to FIG. 3, an arm lock mechanism 71, which releasably fixes a first end 82 of the articulating arm 14 with the projecting second end of the table positioning support 56, is provided on the second end of the table positioning support 56. The arm lock mechanism 71 includes a slot 72, which extends parallel to the axis of and intersects the bore 62 in the support arm 60 to form two clamping members 73 and 74. Flanges 75 extend outward from the clamping members 73 and 74 on either side of the slot 72. A threaded locking screw 76, having a pivoting lever 78, is installed in aligned apertures which extend through the flanges 75.

Preferably, the table positioning support 56 is made of a machined cast iron collar 58 that is attached to a machined cast iron support arm 60. However, it is understood by those skilled in the art from the present disclosure that the table positioning support 56 can be made as a single part or assembled from several components. Additionally, the components of the table positioning support may be made from other materials, such as machined from steel or other suitable materials having the required properties. The locking screws 68 and 76 are preferably interchangeable. However, it is understood by those skilled in the art from the present disclosure that various types and sizes of threaded fasteners could be used, if desired.

Referring now to FIGS. 2 and 3, the articulating arm 14 has first and second ends 82 and 84, respectively. The first end 82 is pivotably coupled with the projecting part of the table positioning support 56 and the second end 84 is rotatably coupled with the work piece support table 12. The first end 82 of the arm 14 includes a pivot post 86 which is installed in the bore 62 in the support arm 60 on the projecting part of the table positioning support 56. The arm lock mechanism 71 releasably fixes the pivot post 86 on the first end 82 of the arm 14 with the support arm 60 on the projecting part of the table positioning support 56 to lock the arm 14 in position.

The second end of the arm 14 has a bore 90 defined therein complementary-sized to the work piece support table pivot post 50. The bore 90 has an axis which is parallel to the axis of the arm pivot post 86. The table pivot post 50 is rotatably installed in the arm bore 90.

As shown in FIGS. 2 and 3, a table lock mechanism 88 is located at the second end 84 of the articulating arm 14. The table lock mechanism 88 releasably fixes the work piece support table 12 with the second 84 of the articulating arm 14. Referring particularly to FIG. 3, the table lock mechanism 88 includes a slot 92 defined in the second end 84 of the articulating arm 14. The slot 92 extends parallel to an axis defined by the articulating arm bore 90 and intersects the arm bore 90 to form two clamping members 94 and 96 from the second end 84 of the articulating arm 14. The clamping members 94 and 96 include flanges 98 which extend parallel to and on either side of the slot 92. A locking screw 100, having a pivoting lever 102, is installed in aligned apertures in the respective flanges 98 of the clamping members 94 and 96.

Preferably, the first end 82 of the articulating arm 14 is provided with a pivot post 86 and the second end 84 is provided with a bore 90 to allow the articulating arm 14 of the present invention to be retro-fitted into existing equipment where the pivot post 50 of the support table 12 is installed rotatably and releasably directly into the bore 62 on the table positioning support 56, as shown in FIG. 1. However, it is understood by those skilled in the art from the present disclosure that the shape and length of the articulating arm 14 can be varied, if desired, to suit particular applications. For example, the pivotal couplings at the first and second end 82 and 84 of the articulating arm 14 can take various forms, such as a bore at each end of the arm or a pivot post at each end of the arm, depending on the attachment provisions provided on the table positioning support 56 and the work piece support table 12.

Preferably, the articulating arm 14 is made from machined cast iron having a precision ground pivot post 86 and a precision bore 90. However, it is understand by those skilled in the art from the present disclosure that the articulating arm 14 can be machined from steel or other suitable material having the desired material properties. Additionally, the articulating arm 14 can be made as a forging or a welded assembly from several component parts which is then machined. Preferably, the flange 98 on the clamping member 96 has a threaded aperture, and the locking screw 100 engages the threaded aperture. However, it is understood by those skilled in the art from the present disclosure that a separate nut (not shown) could be used to engage the locking screw 100 after it passed through the aligned apertures in the two flanges 98.

In the preferred embodiment, the locking screw 100 is interchangeable with the locking screws 68 and 76. However, it is understood by those skilled in the art from this disclosure that various threaded fasteners of different sizes could be used for the locking screws 68, 76 and 100.

Figure 7:
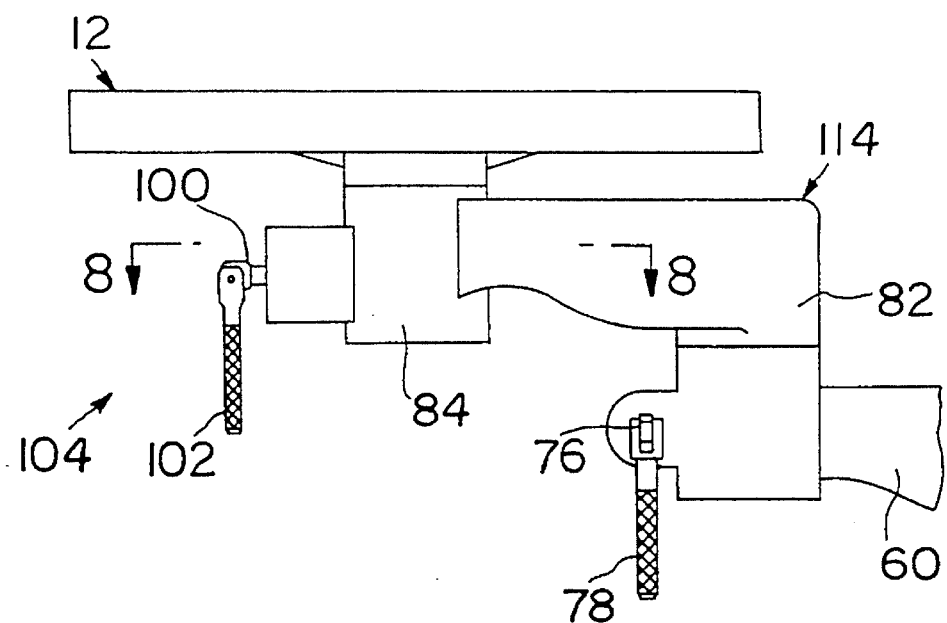
FIG. 7 is an enlarged view of an alternative embodiment of the articulating arm of Fig.2 having an alternative table clamping mechanism.
Figure 8:
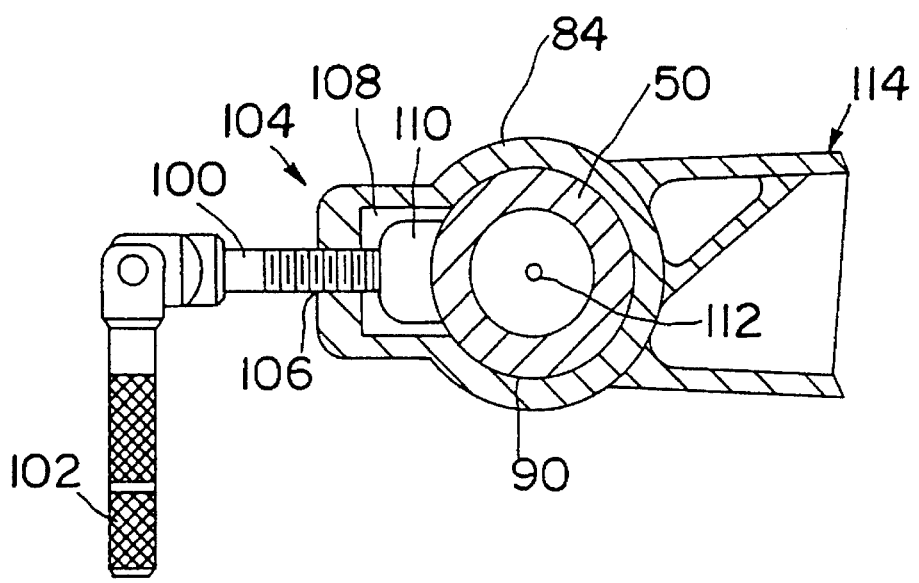
FIG. 8 is a section view of the alternative embodiment of the articulating arm shown in FIG. 7 taken along lines 8—8 in FIG. 7.

Referring now to FIGS. 7 and 8, an alternative embodiment of the articulating arm 114 is shown in detail. The first end 82 of the articulating arm 114 is the same as the articulating arm 14 described above. The second end 84 of the articulating arm 114 has a bore 90 defined therein complementary-sized to the table pivot post 50 and the table pivot post 50 is installed in the arm bore 90. A table lock mechanism 104 is provided on the second end 84 of the arm 114. The table lock mechanism includes a threaded aperture 106 defined in the second end 84 of the articulating arm 114. The threaded aperture 106 extends normal to an axis 112 defined by the arm bore 90 and intersects the arm bore 90. Threaded fastener 100 is adjustably engaged in the aperture 106.

A cavity 108 is formed in the second end 84 of the articulating arm 114 at the intersection of the arm bore 90 and the aperture 106. A lock shoe 110 is disposed in the cavity 108 between the fastener 100 and the table pivot post 50.

The articulating arm 114 is preferably made as a unitary structure from cast iron with the cavity 108 formed in the second end 84 of the arm 114. The bore 90 is machined in the second end 84 of the arm 114. However, it is understood by those skilled in the art from the present disclosure that the alternative arm 114 with the table lock mechanism 104 can be made by other methods, such as machining the entire arm 14 out of a piece of suitable material, such as steel. Preferably, the lock shoe 110 has a curved face which is positioned adjacent to the table pivot post 50. The radius of the curved face is preferably less than the radius of the pivot post 50. However, it is understood by those skilled in the art from the present disclosure that other configurations such as a lock shoe having serrations or teeth could be used depending on the particular application.

A brief description of the use of the machine tool apparatus 10 having a work piece support table 12 supported by an articulating arm 14 follows with reference to FIGS. 2 and 4–6. In use, a tool for carrying out the desired operation, such as a drill bit for drilling a hole, is placed into the chuck 36 and locked into position by tightening the chuck. A work piece (not shown) is clamped to the work piece support table 50. Generally, the work piece support table 50 is in an initial position as shown in FIG. 4, with the articulating arm 14 aligned with the support arm 60 of the table positioning support 56. The table positioning support lock mechanism 63, the arm lock mechanism 71 and the work piece support table lock mechanism 88 are locked to fix the table positioning support 56, the articulating arm 14 and the table 12 in position. The work piece is clamped to the support table 12 in the proper position to carry out a drilling operation at a first position. Power is supplied to the motor 22 in the head assembly 21 and torque is transmitted by the transmission mechanism 38 to the spindle to turn the drill chuck 36. The hand levers 37 are used to move the quill, the spindle and the attached drill chuck 36 and drill down to drill a hole in the work piece. The hand levers 37 are then released to withdraw the drill from the hole in the work piece. Power to the motor is turned off and the work piece is then repositioned to drill the next hole.

Figure 5:
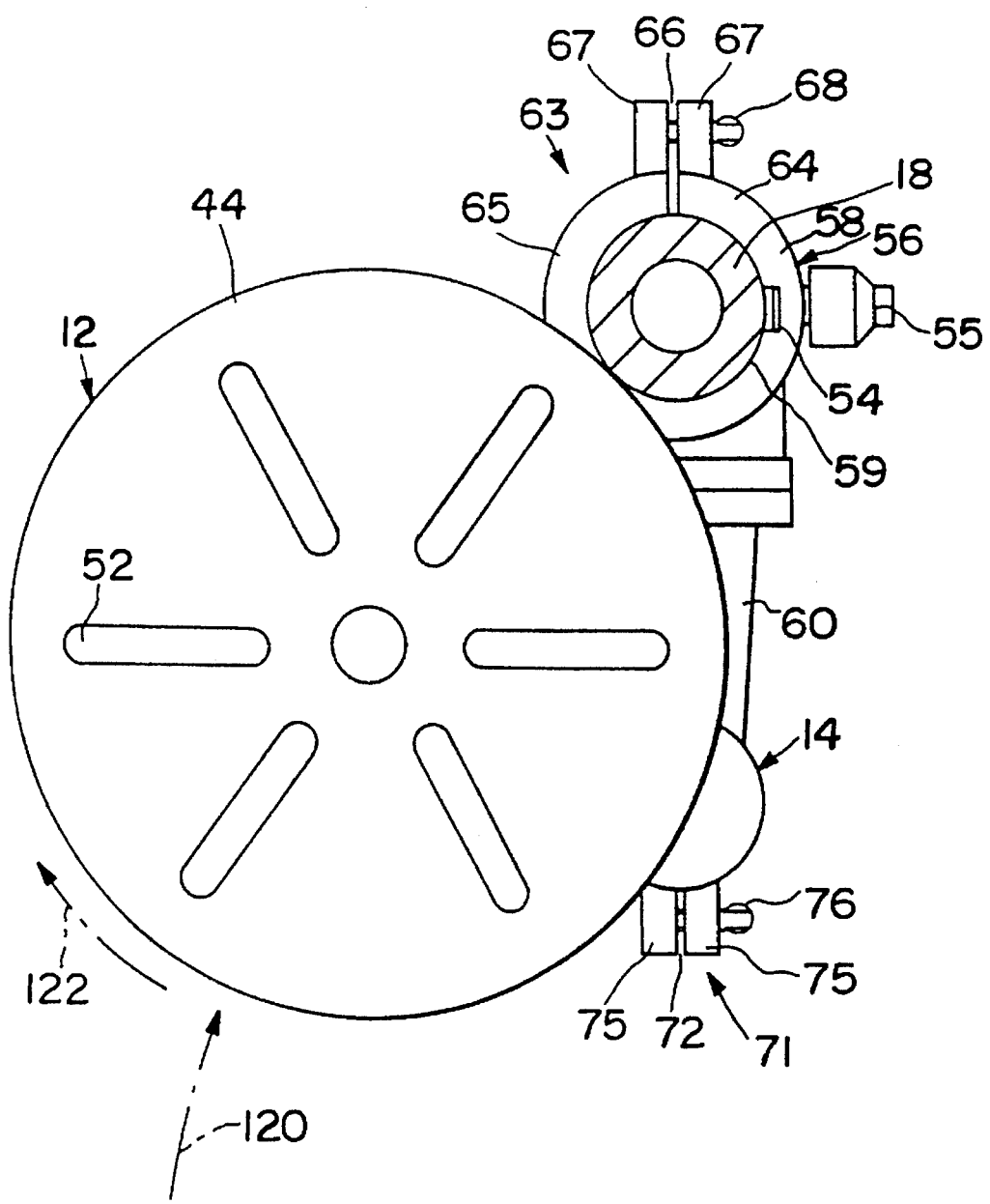
FIG. 5 is a view similar to FIG. 4 showing the support table mounted on the articulating arm in a second position.

Several options are available for repositioning the work piece relative to the chuck 36 and drill on the head assembly 21. Referring to FIG. 5, the support table 12 has been repositioned by loosening the locking screw 76 to unclamp the arm lock mechanism 71. The articulating arm 14 is then pivoted about pivot post 86 in the clockwise direction, as indicated by the arrow 120, to a desired position. The locking screw 76 is then tightened causing the clamping members 73 and 74 to deflect inward and clamp against the arm pivot post 86, locking the articulating arm 14 in a fixed position. The support table 12 may also be rotated relative to the articulating arm 14 by loosening the locking screw 100 on the table lock mechanism 88, shown in FIGS. 2 and 3, and turning the support table 12, as indicated by the arrow 122, until the work piece is in the desired location. The locking screw 100 is then tightened causing the clamping members 94 and 96 to deflect inward and clamp against the table pivot post 50, locking the table 12 in a fixed position. Adjusting the support table 12 and the work piece position in this manner provides two degrees of freedom for accurately positioning the work piece without unclamping it from the support table 12.

Figure 6:
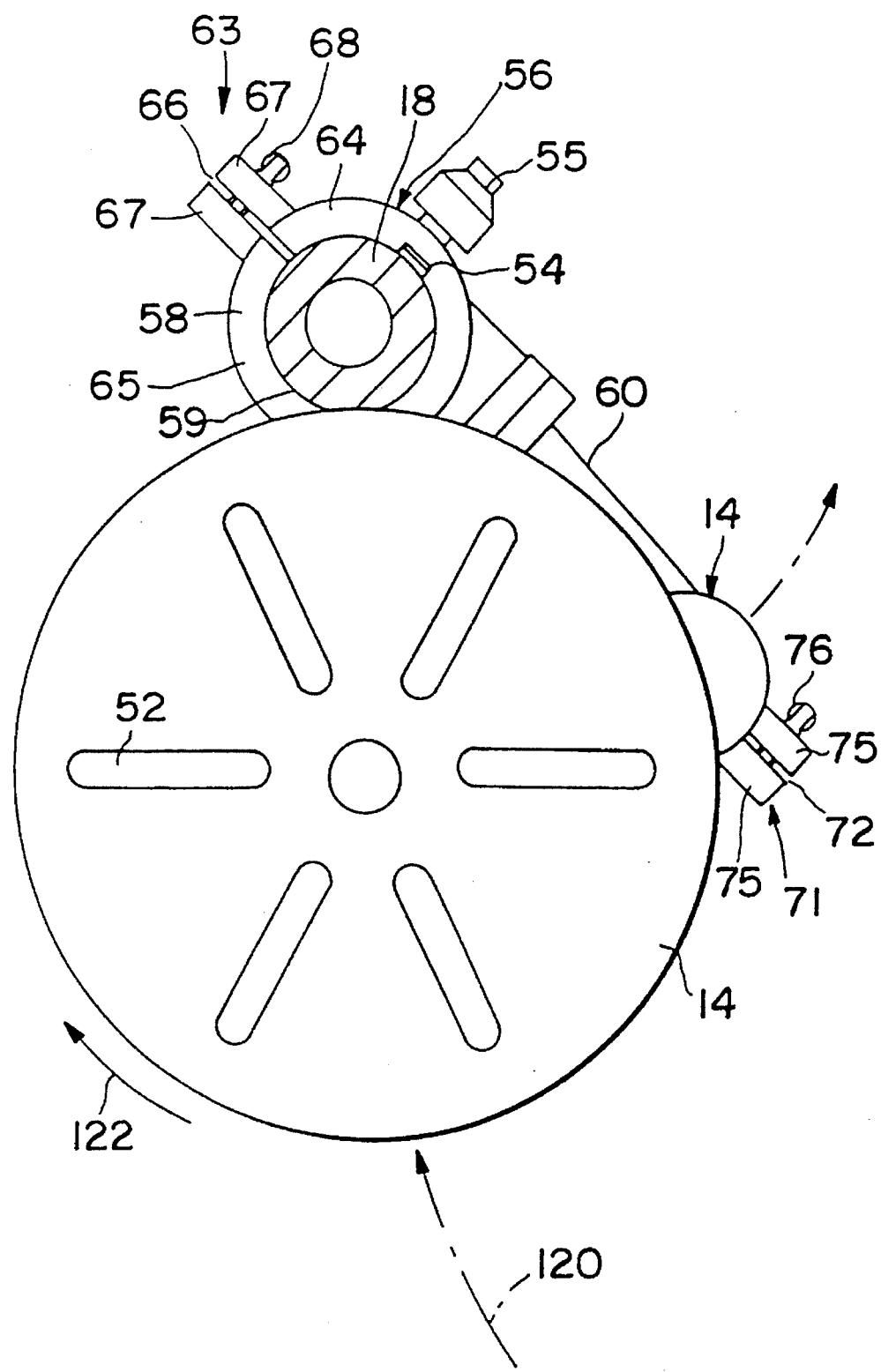
FIG. 6 is a view similar to FIG. 4 showing the support table mounted on the articulating arm in a third position.

Alternatively, the support table 12 may be repositioned as shown in FIG. 6. The locking screw 68 on the table positioning support lock mechanism 56 and the locking screw 76 on the arm lock mechanism 71 are loosened. The table positioning support 56 is rotated relative to the column 18, and the articulating arm 14 is rotated relative to the support arm 60 on the table positioning support 56, as indicated by the arrows. When the support table 12 is in the desired position, the locking screws 68 and 76 are tightened to fix the position of the table positioning support 56 relative to the column 18 and the articulating arm 14 relative to the table positioning support 56. The table 12 can also be rotated, as described above in conjunction with FIG. 5, to accurately position the work piece. Adjusting the support table 12 and the work piece position in this manner provides three degrees of freedom for accurately positioning the work piece without unclamping it from the support table 12.

If the alternative articulating arm 114 is used, the locking screw 100 on the table lock mechanism 104, shown in FIGS. 7 and 8, is loosened. After the table 12 has been rotated to the desired position, the locking screw 100 is tightened, forcing the locking shoe 110 against the table pivot post 50 to lock the table 12 in a fixed position relative to the arm 114.

As will be understood by those skilled in the art from the present disclosure, the above two examples are not intended to be limiting, and the work piece position can be adjusted by any combination of movement of the table positioning support 56, the articulating arm 14 and the table 12.

Once the work piece has been properly repositioned, power to the motor 22 is turned on and the next drilling operation is carried out.

It will be further appreciated that while it will be necessary to supply only an articulating arm 14, 114 or the like in those cases where the work piece support table is rotatably and releasably coupled to a projecting support arm of a table positioning support of an existing machine tool apparatus, it may be necessary or desirable to provide such an articulating arm with a rotatably coupled work piece support table and with a pivotally coupled support arm for replacing a non-rotatably or non-releasably coupled work piece support table and support arm of an existing machine tool apparatus.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A machine tool apparatus having a work piece support table supported by an articulating arm comprising:

a stand;

a motor on the stand;

a moveable cutting tool holder on the stand;

a transmission mechanism drivingly coupled between the motor and the cutting tool holder on the stand;

a work piece support table;

a table positioning support movably coupled to the stand, part of the support projecting outwardly from the stand; and an arm having first and second ends, the first end is pivotally coupled with the projecting part of the table positioning support, and the second end is rotatably coupled with the work piece support table.

2. The apparatus of claim 1 further comprising:

an arm lock mechanism releasably fixing the first end of the arm with the projecting part of the table positioning support.

3. The apparatus of claim 2 further comprising:

a table lock mechanism releasably fixing the work piece support table with the second end of the arm.

4. The apparatus of claim 1 further comprising a table lock mechanism releasably fixing the work piece support table with the second end of the arm.

5. The apparatus of claim 4 wherein the table includes a cylindrical pivot post, the second end of the arm has a bore defined therein complementary sized to the table pivot post and the table pivot post is installed in the arm bore, and wherein the table lock mechanism includes a slot defined in the second end of the arm and the slot extends parallel to an axis defined by the arm bore and intersects the arm bore to form two clamping members from the second end of the arm.

6. The apparatus of claim 4 wherein the table includes a cylindrical pivot post, the second end of the arm has a bore defined therein complementary sized to the table pivot post and the table pivot post is installed in the arm bore, and wherein the table lock mechanism includes a threaded aperture defined in the second end of the arm, the threaded aperture extends normal to an axis defined by the arm bore and intersects the arm bore, and a threaded fastener is adjustably engaged in the aperture.

7. The apparatus of claim 6 further comprising:

a cavity formed in the arm at the intersection of the arm bore and the aperture; and a lock shoe disposed in the cavity between the fastener and the table pivot post.

8. The apparatus of claim 1 wherein the projecting part of the table positioning support includes a bore and wherein the first end of the arm comprises a pivot post installed in the bore.

9. The apparatus of claim 8 wherein the bore in the projecting part of the table positioning support defines an axis parallel to at least one direction of motion of the table positioning support.

10. The apparatus of claim 1 wherein the table positioning support is pivotally coupled to the stand.

11. An improvement for a machine tool apparatus including a stand, a motor on the stand, a moveable cutting tool holder on the stand, a transmission mechanism drivingly coupled between the motor and the cutting tool holder on the stand, a work piece support table, and a table positioning support movably coupled to the stand, wherein the improvement comprises:

an arm having first and second ends, the first end is adapted to be pivotally coupled with the table positioning support and the second end is adapted to be rotatably coupled with the work piece support table.

12. The apparatus of claim 11 wherein a part of the table positioning support projects outwardly from the stand and further comprising a lock mechanism on the arm configured to respectively releasably fix one of the first and second ends of the arm with one of the projecting part of the table positioning support and the work piece support table.

13. The apparatus of claim 12 wherein the work piece support table includes a cylindrical pivot post, the second end of the arm has a complementary sized bore defined therein, and wherein the lock mechanism includes a slot defined in the second end of the arm and the slot extends parallel to an axis defined by the arm bore and intersects the arm bore to form two clamping members from the second end of the arm.

14. The apparatus of claim 12 wherein the work piece support table includes a cylindrical pivot post, the second end of the arm has a complementary sized bore defined therein, and wherein the lock mechanism includes a threaded aperture defined in the second end of the arm and the threaded aperture extends normal to an axis defined by the arm bore and intersects the arm bore, and a threaded fastener is adjustably engaged in the aperture.

15. The apparatus of claim 14 further comprising:

a cavity formed in the arm at the intersection of the arm bore and the aperture; and a lock shoe disposed in the cavity between the fastener and the table pivot post.

16. The apparatus of claim 11 wherein a projecting part of the table positioning support includes a bore and wherein the first end of the arm comprises a pivot post sized to be installed in the bore.

17. The apparatus of claim 16 wherein the bore in the projecting part of the table positioning support defines an axis parallel to at least one direction of motion of the table positioning support.

18. An improvement for a machine tool work piece table, the machine tool including a stand, a motor on the stand, a moveable cutting tool holder on the stand, a transmission mechanism drivingly coupled between the motor and the cutting tool holder on the stand, a work piece support table, and a table positioning support pivotally coupled to the stand, wherein the improvement comprises:

an arm having first and second ends, the first end is adapted to be pivotally coupled with the table positioning support, and the second end is adapted to be rotatably coupled with the work piece support table.

19. A drill press having a work piece support table supported by an articulating arm comprising:

a stand including a column mounted to a base;

a head assembly mounted to the column, the head assembly includes a motor, a spindle and a transmission mechanism drivingly coupled between the motor and the spindle;

a drill chuck drivenly coupled with the spindle;

a table positioning support having first and second ends, the first end of the table positioning support being movably mounted on the column at least for movement in a vertical direction, and the second end of the table positioning support includes a bore;

an arm having first and second ends, the first end of the arm includes an arm pivot post pivotally received in the table positioning support bore and the second end of the arm includes a bore;

a work piece support table, the table includes a cylindrical pivot post pivotally received in the arm bore;

a table positioning support lock mechanism releasably fixing the first end of the table positioning support with the column;

an arm lock mechanism releasably fixing the first end of the arm with the second end of the table positioning support; and a table lock mechanism releasably fixing the work piece support table with the second end of the arm.

20. The drill press apparatus of claim 19 wherein the table positioning support is further mounted for pivotal movement on the column in a plane perpendicular to the column.

* * * * *